US010534899B2

(12) United States Patent
Adams (10) Patent No.: US 10,534,899 B2
(45) Date of Patent: Jan. 14, 2020

(54) UTILIZING INPUTS FOR ACCESSING DEVICES

(71) Applicant: BlackBerry Limited, Waterloo (CA)

(72) Inventor: Neil Patrick Adams, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 163 days.

(21) Appl. No.: 15/685,571

(22) Filed: Aug. 24, 2017

(65) Prior Publication Data

US 2019/0065714 A1 Feb. 28, 2019

(51) Int. Cl.
*G06F 21/31* (2013.01)
*G06F 21/32* (2013.01)
*G06F 21/41* (2013.01)
*H04W 12/06* (2009.01)

(52) U.S. Cl.
CPC .............. *G06F 21/31* (2013.01); *G06F 21/32* (2013.01); *G06F 21/41* (2013.01); *H04W 12/06* (2013.01)

(58) Field of Classification Search
CPC ....................................................... G06F 21/31
See application file for complete search history.

(56) References Cited

U.S. PATENT DOCUMENTS

| 5,283,883 | A | * | 2/1994 | Mishler | .................... | G06F 13/28 |
| | | | | | | 710/33 |
| 5,504,902 | A | * | 4/1996 | McGrath | .................... | G06F 8/33 |
| | | | | | | 715/703 |
| 6,766,456 | B1 | * | 7/2004 | McKeeth | ................ | G06F 21/31 |
| | | | | | | 726/2 |
| 7,124,300 | B1 | | 10/2006 | Lemke | | |
| 7,327,860 | B2 | | 2/2008 | Derakhshani et al. | | |
| 7,665,146 | B2 | | 2/2010 | Munje et al. | | |
| 7,715,593 | B1 | * | 5/2010 | Adams | ................ | G06Q 20/327 |
| | | | | | | 340/5.53 |

(Continued)

OTHER PUBLICATIONS

Mizuno et al.; Authentication using multiple communication channels; Published in: Proceeding DIM '05 Proceedings of the 2005 workshop on Digital identity management; pp. 54-62; Nov. 11-11, 2005; ACM Digital Library (Year: 2005).*

(Continued)

*Primary Examiner* — Bradley W Holder
(74) *Attorney, Agent, or Firm* — Rowand LLP (57) ABSTRACT

Devices and methods of access control are provided. A device includes a processor, an input interface coupled to the processor, and a memory coupled to the processor. The device may be configured to receive a first input via a first input interface and determine whether the first input includes valid first authentication data, invalid authentication data, or duress authentication data. Based on the determination, if the first input includes valid authentication data, allow access. If the first input includes invalid authentication data, disallow access. If the first input includes duress authentication data, allow access when a second input received via a second input interface includes valid second authentication data. Example inputs include iris scan input, retinal scan input, fingerprint scan input, handprint input, palm print input, facial recognition input, alphanumeric input, touchscreen gesture input, breathalyzer sample input, facial or hand gesture input, or voice input, among others.

20 Claims, 3 Drawing Sheets

(56) References Cited

U.S. PATENT DOCUMENTS

| | | | |
|---|---|---|---|
| 7,720,461 B2* | 5/2010 | Thornton | H04W 12/12 370/354 |
| 7,948,938 B2* | 5/2011 | Brown | G06F 21/31 340/426.12 |
| 7,986,816 B1* | 7/2011 | Hoanca | G06K 9/00892 382/115 |
| 8,081,952 B2* | 12/2011 | Thornton | H04W 12/12 340/539.13 |
| 8,289,916 B2* | 10/2012 | Brown | G06F 21/31 340/426.12 |
| 8,503,974 B2* | 8/2013 | Brown | G06F 21/31 455/404.1 |
| 8,536,978 B2* | 9/2013 | Coggill | G06F 21/36 340/5.54 |
| 8,539,248 B2 | 9/2013 | Hagiwara et al. | |
| 9,020,462 B2* | 4/2015 | Hodgson | H04M 1/72538 379/37 |
| 9,367,677 B1 | 6/2016 | Adhami et al. | |
| 9,553,969 B2 | 1/2017 | Munje et al. | |
| 9,953,231 B1* | 4/2018 | Medina, III | G06F 21/32 |
| 2005/0169503 A1 | 8/2005 | Howell et al. | |
| 2006/0031289 A1 | 2/2006 | Experton | |
| 2007/0032267 A1 | 2/2007 | Haitani et al. | |
| 2007/0198850 A1* | 8/2007 | Martin | G07C 9/00087 713/186 |
| 2007/0250920 A1* | 10/2007 | Lindsay | G06F 21/31 726/7 |
| 2008/0148059 A1* | 6/2008 | Shapiro | G06F 21/32 713/186 |
| 2010/0122350 A1* | 5/2010 | Munje | H04M 1/66 726/28 |
| 2010/0138914 A1 | 6/2010 | Davis et al. | |
| 2010/0185871 A1* | 7/2010 | Scherrer | G06F 21/6218 713/186 |
| 2013/0007876 A1 | 1/2013 | Davis et al. | |
| 2013/0024947 A1* | 1/2013 | Holland | G06F 21/34 726/28 |
| 2015/0319294 A1* | 11/2015 | Sudhir | H04M 1/72541 455/411 |
| 2015/0356287 A1* | 12/2015 | Simmonds | G06F 21/31 726/28 |
| 2016/0180078 A1* | 6/2016 | Chhabra | G06F 21/31 726/19 |
| 2016/0318521 A1 | 11/2016 | Nothacker et al. | |
| 2017/0193213 A1* | 7/2017 | Tsou | G06F 21/32 |

OTHER PUBLICATIONS

Xiao et al; MIMO-assisted channel-based authentication in wireless networks; Published in: 2008 42nd Annual Conference on Information Sciences and Systems; Date of Conference: Mar. 19-21, 2008; IEEE Xplore (Year: 2008).*

EPO, Partial European Search Report (R. 64 EPC), relating to application No. 18188316.6 dated Sep. 27, 2018.

Spencer, Mike: "On Deniability and Duress", Jan. 27, 2017, XP055507721, retrieved from the Internet: URL: http://www.mit.edu/~specter/articles/17/deniability1.html.

EPO, Extended European Search Report, relating to application No. 18188316.6, dated Dec. 17, 2018.

Hildenbrand, Jerry: "My Data My Rules—Your privacy, fingerprints and the Fifth Amendment" dated Feb. 1, 2017, retrieved from https://www.androidcentral.com/your-privacy-your-fingerprints-and-fifth-amendment on Mar. 20, 2017.

* cited by examiner

UTILIZING INPUTS FOR ACCESSING DEVICES

FIELD

The present application generally relates to accessing a device and, in particular, to utilizing received inputs for accessing the device.

BACKGROUND

A modern electronic device may implement a sequence of operations for identifying a user of the electronic device. The electronic device may require a user provide an identifier via an input interface to distinguish that user from other potential users of the device. Example identifiers include name identifiers (e.g., John), alphanumeric passwords, or one-time codes (OTC). Electronic devices may also be equipped with biometric input interfaces for receiving biometric input for user identification.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In a first aspect, the present application describes an access control method. The method includes receiving a first input via a first input interface; determining whether the first input includes valid first authentication data, invalid authentication data, or duress authentication data; and based on the determination, if the first input includes valid first authentication data, allowing access; if the first input includes invalid authentication data, disallowing access; and if the first input includes duress authentication data, allowing access when a second input received via a second input interface includes valid second authentication data.

In another aspect, the present application describes an electronic device. The electronic device includes a processor; an input interface including a first input interface and a second input interface coupled to the processor to receive input; and a memory coupled to the processor and storing processor-readable instructions. When executed, the processor-readable instructions cause the processor to receive a first input via a first input interface; determine whether the first input includes valid first authentication data, invalid authentication data, or duress authentication data; and based on the determination, if the first input includes valid first authentication data, allow access to the electronic device; if the first input includes invalid authentication data, disallow access to the electronic device; and if the first input includes duress authentication data, allow access to the electronic device when a second input received via a second input interface includes valid second authentication data.

In yet a further aspect, the present application describes non-transitory computer-readable storage medium storing processor-readable instructions which, when executed, configure a processor to perform one or more of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

Many examples described herein relate to accessing electronic devices. For example, electronic devices may include an endpoint including one or more of any of the following: mobile devices (e.g., smartphones, tablets, phablets, laptops, wearables, gaming devices, navigation devices, cameras, etc.), computers (e.g., laptops, desktops, all-in-one computers, etc.), IoT (Internet of Things) devices (e.g., vehicles, appliances, smart devices, connected devices, buildings including homes, etc.), EoT (Enterprise of Things) devices (i.e., IoT devices in an enterprise) and any other nodes or combination thereof. In addition, the examples described herein may relate to accessing portions of a system, device, or article requiring that specific users be identified prior to operation of those systems, devices or articles. For example, the examples described herein may relate to accessing a file, file system, user profiles, or applications (e.g., banking applications, business/enterprise/government applications).

Many example methods described herein may also apply to examples relating to physical access to property that may be configured for interacting with a user. For example, methods described herein may apply to accessing buildings/houses/offices, rooms or portions of buildings/houses/offices, or vehicles. Vehicles may include motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing. Accordingly, the present application is not limited simply to computing devices, but may be applied to any other systems, devices, or articles requiring that specific users be identified prior to operation of those systems, devices, or articles.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Upon start-up or initialization, modern devices may include a sequence of operations for identifying users of such devices. The device may require that a user provide an identifier to distinguish that user from other potential users of the device. In some examples, the device may be equipped to receive name identifiers, alphanumeric passwords, or one-time codes. In other examples, devices may be configured with biometric input interfaces for receiving biometric input for user identification. Non-limiting examples of biometric input may include iris scan input, retinal scan input, fingerprint scan input, handprint input, palm print input, or facial recognition input.

Iris scan input may be used for biometric identification of a user. Methods and systems utilizing iris recognition may utilize pattern-recognition techniques on images of one or both of the irises of a user's eyes. The iris of an eye may include patterns that are relatively unique, stable, and viewable by an imaging device. Retinal scan input may also be used for biometric identification of the user. Methods and systems utilizing retinal scan recognition may utilize unique structure of a user's retinal blood vessel for distinguishing that user from other users. In another example, fingerprint scan input may also be used for biometric identification of the user. Methods and systems utilizing fingerprint scan recognition may utilize the unique pattern of fingerprint ridges on the user's finger for distinguishing that user from other users. Although the present application discusses iris scan, retinal scan, and fingerprint scan inputs as examples for biometric identification, aspects of the present application are not limited to the aforementioned examples of biometric identification and may be applied or implemented with other types of biometric scan inputs for distinguishing the user from other users. For example, handprint or palm print recognition may utilize optical, thermal, or tactile input methods for identifying patterns of ridges and creases in an image of a hand or palm, including any scars, creases, or textures. Facial recognition systems may utilize digital or video images and may verify facial features of a digital or video image with facial feature data stored in a database.

Figure 1:
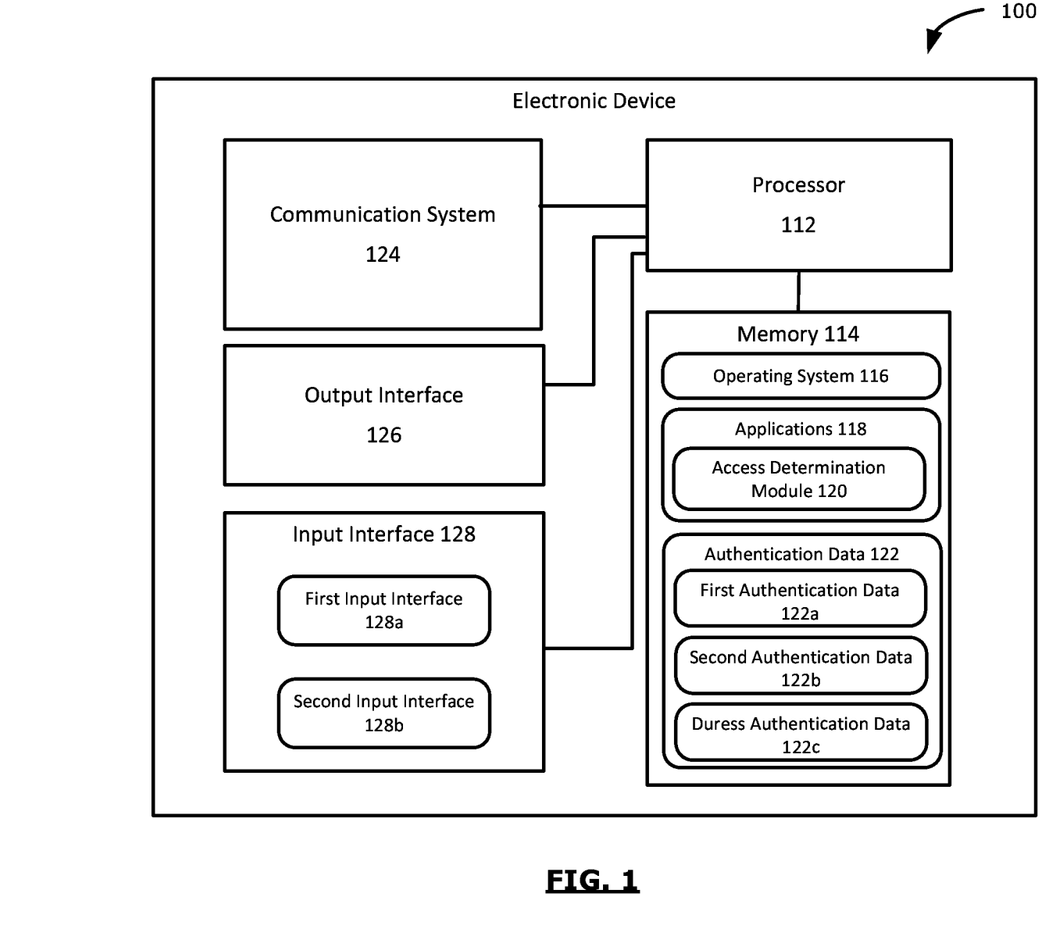
FIG. 1 illustrates a block diagram of an electronic device, in accordance with an embodiment of the present application.

Reference is now made to FIG. 1, which illustrates a block diagram of an electronic device 100, in accordance with an embodiment of the present application. The electronic device 100 may include a processor 112, memory 114, a communication system 124, an output interface 126, and an input interface 128. The memory 114 may be coupled to the processor 112 and may store processor-readable instructions that, when executed, cause the processor 112 to perform at least some of the operations described herein. The communication system 124 may be coupled to the processor 112 for providing subsystems for wired or wireless data communication and wired or wireless voice communication. The output interface 126 may be coupled to the processor 112 to provide an output to a user of the electronic device 100. The input interface 128 may be coupled to the processor 112 to receive input from the user of the electronic device 100.

The communication system 124 may include subsystems for wired or wireless data communication and wired or wireless voice communication. In some embodiments, the communication system 124 may include subsystems for cellular data and voice connectivity via a cellular system. The cellular system may include a system operating in accordance with one or more of a variety of cellular voice and data protocols for connectivity and communication, including 5G, 4G, and 3G systems. The communication system 124 may further include a subsystem for wireless local area network (WLAN) connectivity with an access point, which may be operating in accordance with IEEE 802.11 protocol, for example. The communication system 124 may provide the electronic device 100 with other wired or wireless connections for accessing the network 180.

The electronic device 100 may include an output interface 126, such as a display, and at least one input interface 128. In some examples, the at least one input interface 128 may be coupled to a touch sensitive overlay on a display for detecting touch-based input. Other examples of input interface devices may include physical or virtual keyboards, keypads, touchpads, mice, keyboard with touch-sensitive surface, or various buttons. Further examples of input interface devices may also include biometric input devices, such as retinal scan input devices, iris scan input devices, fingerprint scan input devices, breathalyzer sampling input devices, etc.

The at least one input interface 128 may include a first input interface 128a and a second input interface 128b. As an illustrative example, the first input interface 128a may include a biometric input device including at least one of an iris scan input device, a retinal scan input device, or a fingerprint scan input device. The second input interface 128b may include a non-biometric input device including at least one of a virtual or physical keyboard for receiving alphanumeric input, a touchscreen device for receiving a touchscreen gesture input, or a breathalyzer sampling input device for receiving a breathalyzer sample input. Any other combination of biometric or non-biometric input devices may be implemented as an input interface 128. Although the first input interface 128a and the second input interface 128b are described as separate input interfaces, in some examples, the second input interface 128b may be integral with the first input interface 128a. For example, the first input interface 128a may be a touch-sensitive display screen for displaying graphics to a user and for receiving touch-input from the user. Further, the touch-sensitive display screen may incorporate the second input interface 128b, such as a fingerprint sensor (e.g., second input interface 128b). That is, the example fingerprint sensor may be integrated into the touch-sensitive display screen (e.g., first input interface 128a).

The memory 114 may include volatile and non-volatile memory. At least a part of the memory 114 may store processor-readable instructions that, when executed by the processor 112, cause the processor to carry out some of the operations described herein. The processor-readable instructions stored in memory 114 may include an operating system 116 which may provide basic device functions and may create a run-time environment within which other software may be executed. The memory 114 may also store a plurality of application 118, where the term "application" refers to a set of processor-executable instructions that configure or adapt the processor 112 to carry out a particular algorithm or set of steps or operations. Example applications 118 may include messaging applications, word processing applications, calculators, media playback applications, or other such applications. Other example applications 118 may include device management applications, such as user identification or authentication applications, device power management applications, etc.

The applications 118 stored in the memory 114 may include an access determination module 120 which includes instructions for determining whether received user inputs is verified against authentication data for allowing the user to access the electronic device 100, as described herein. The memory 114 may include authentication data 122, where the authentication data 122 may include, for example, first authentication data 122a, second authentication data 122b, and duress authentication data 122c.

As will be described herein, when the electronic device 100 receives a first input via the first input interface 128a, the processor 112 may determine whether the first input is valid first authentication data 122a, invalid authentication data, or duress authentication data 122c. Based on that determination, if the first input is valid first authentication data 122a, the processor 112 may allow access to the electronic device 100. If the first input is invalid authentication data, the processor 112 may disallow access to the electronic device 100. If the first input is duress authentication data 122c, the processor 112 may allow access to the electronic device 100 when a second input received via the second input interface 128b is valid second authentication data 122b.

The electronic device 100 may include other components apart from those identified in FIG. 1 including, for example, a power source or an interface for connecting to a power source.

As described, the electronic device 100 may include instructions for implementing a sequence of operations for identifying the user of the electronic device 100. To illustrate the methods and devices described herein, an illustrating example will be described. The electronic device 100 may include a fingerprint scan input device for receiving a user fingerprint. The electronic device 100 may be installed in any system, device, or article that may require specific users be identified prior to operation of those systems, devices, or articles. For example, the received user fingerprint may be used for identifying the user and, subsequently, allowing the user to access the device if the received user fingerprint is verified against authentication data.

In some scenarios, a third party may attempt to compel a user to place the user's fingerprint on the fingerprint scan input device for unlocking the device, such that the third party may examine contents of the user's device or data thereon. The user's fingerprint and the compelled use of the user's fingerprint to unlock the user's device may, for example, be legally permissible in a particular country, for example, with a valid search warrant. On the other hand, the user's passcode (e.g., alphanumeric password entered via a virtual or physical keyboard) and the compelled use of the passcode may, in some countries or scenarios, not be legally permissible.

Accordingly, it may be advantageous to provide the user with the convenience of accessing the device or data thereon under normal circumstances by using the user's fingerprint(s) (e.g., biometric input), while providing the user with a mechanism to force the device to utilize a different input interface (e.g., non-biometric input) when the user may be under duress or may be under coercion by a third party to use the user's biometric features for accessing the device or data thereon.

Figure 2:
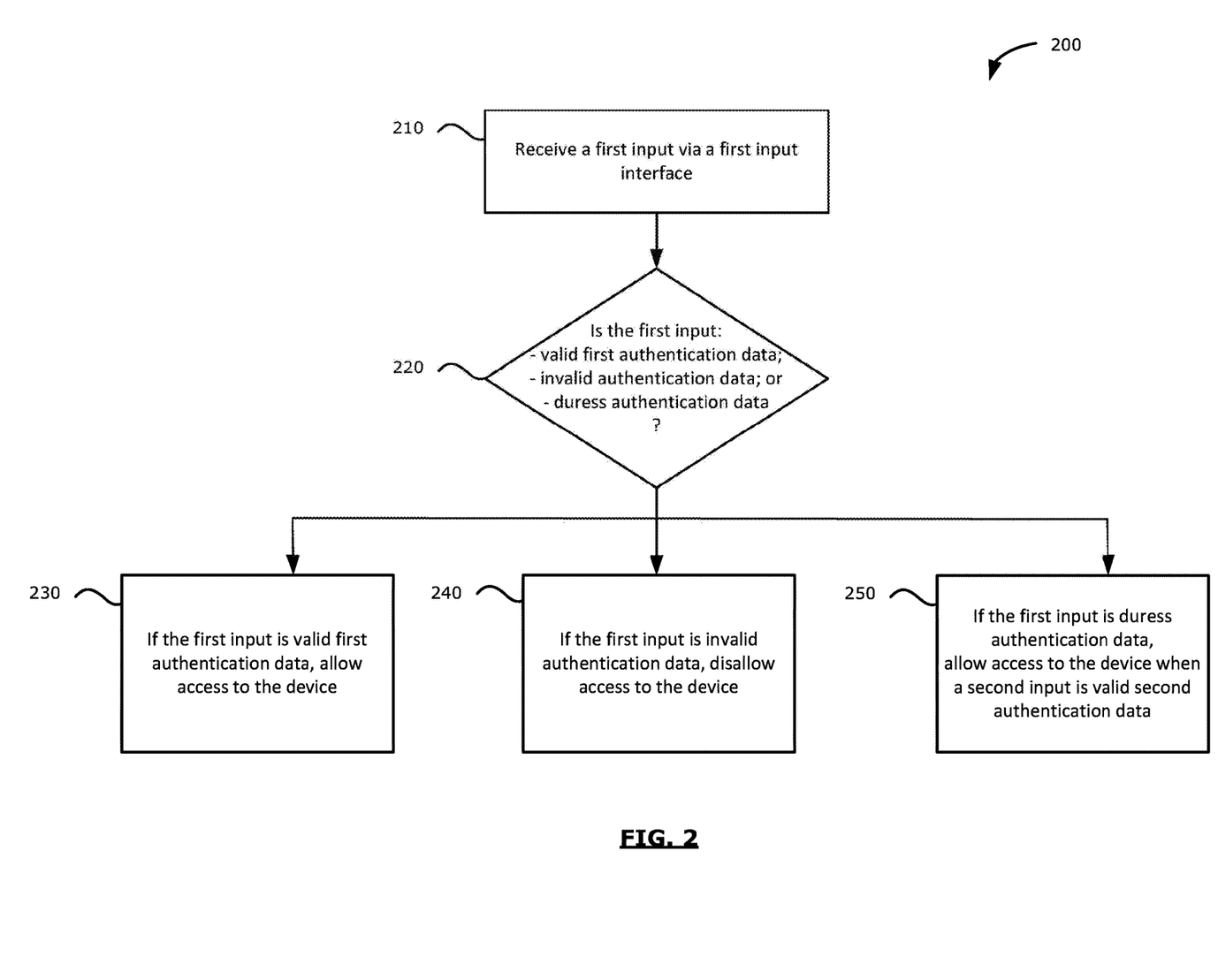
FIG. 2 illustrates, in flowchart form, a method of accessing the electronic device of FIG. 1, in accordance with an embodiment of the present application.

To illustrate, reference is now made to FIG. 2, which illustrates, in flowchart form, a method 200 of accessing the electronic device 100 of FIG. 1, in accordance with an embodiment of the present application. The method 200 may include operations that may be carried out by the electronic device 100 (FIG. 1). The method 200 may be implemented, at least in part, through processor-executable instructions stored for example at the access determination module 120 (FIG. 1). In some examples, one or more of the operations may be implemented via processor-executable instructions in other applications 118 or in the operating system 116. For ease of exposition, the method 200 of accessing the electronic device 100 may be described with the example relating to third parties compelling the user to use the user's fingerprint for unlocking the device or portions of the device. It will be understood that although the method 200 is described in the context of the example computing devices as an electronic device 100 (e.g., mobile device, computer, IoT device, EoT device, etc.) with example input interfaces, some aspects of the method 200 may be applied to other contexts, such as to automotive vehicles, industrial machinery, etc. with other example input interface combinations. For example, the electronic device 100 with example input interfaces may be installed in the automotive vehicles, industrial machines, or banking machines, where identification of specific users prior to operation may be required.

At operation 210, the processor 112 may receive a first input via a first input interface 128a. For example, the first input interface 128a may be a fingerprint scan input device, such as a fingerprint scanner, on the electronic device. A user may place their finger on the fingerprint scanner, and the processor 112 may receive a fingerprint image from the fingerprint scanner.

At operation 220, the processor 112 may determine whether the first input is valid first authentication data 122a (FIG. 1), invalid authentication data, or duress authentication data 122c (FIG. 1).

First authentication data 122a may include data relating to fingerprint images of the electronic device user and that is stored in the memory 114 (FIG. 1). For example, when a user initially sets up their electronic device 100, the electronic device 100 may prompt the user to provide several images of one or more fingerprints from one or more fingers. The fingerprint images may be processed and identifying features associated with that user's fingerprint images may be stored as first authentication data 122aa.

In some embodiments, the first authentication data 122a may include data relating to fingerprint images of the electronic device user, and the first authentication data 122a may be stored on a secure device or a smart card (e.g. card having an embedded integrated circuit and configured for personal identification, authentication, data storage, and/or application processing). The smart card may be configured within the electronic device 100 or be configured external to the electronic device 100. In this example, the received first input, such as fingerprint data, may be verified against the first authentication data 122a stored on the smart card. For example, the received first input may be processed (e.g., hashed or transformed) and be compared with the first authentication data 122a for determining whether the first input data corresponds to the stored first authentication data 122a.

Accordingly, at operation 220, the processor 112 may determine whether the first input is valid first authentication data 122a by comparing the first input, received via the first input interface 128a, with stored first authentication data 122a.

If the received first input is verified against one or more sets of first authentication data 122a, at operation 230, the processor 112 may determine that the first input is valid authentication data, and the processor 112 may allow access to the electronic device 100.

If the received first input fails to be verified against one or more sets of the first authentication data 122a, at operation 240, the processor 112 may determine that the first input is invalid authentication data, and the processor 112 may disallow access to the electronic device 100.

At operation 220, the processor 112 may also determine whether the first input is duress authentication data 122c (FIG. 1). Duress authentication data 122c may include data relating to specific fingerprint images of the electronic device user that, when verified with received first input, may trigger the processor 112 to execute a different set of operations. Duress authentication data 122c may be associated with a duress event, such as when the electronic device user is being compelled by a third party to unlock or to access the electronic device 100 using the electronic device user's fingerprint (or other biometric input). Accordingly, when the electronic device user is being compelled to unlock the electronic device 100 using the user's fingerprint, the user may present a "duress fingerprint" that the user knows will be verified against the duress authentication data 122c.

At operation 250, if the received first input is verified against the duress authentication data 122c, the processor 112 may allow access to the electronic device 100 when a second input received via a second input interface 128b (FIG. 1) is verified against the second authentication data 122b. That is, if the received first input is verified against the duress authentication data 122c, the processor 112 may require that another input be received to be examined before access to the electronic device may be granted.

Second authentication data 122b may include data that is different than fingerprint data. For example second authentication data 122b may include data relating to alphanumeric passwords, passphrases, PINs (personal identification numbers), codes, tokens, keys, answers to questions, graphical passwords, 3-D gestures, or touchscreen gesture passwords. The second authentication data 122b may include identifiers such as non-biometric identifiers and may be derived from second inputs received via the second input interface 128b (FIG. 1). For example, the second authentication data 122b may be data relating to alphanumeric passwords for accessing the electronic device 100. Continuing with the aforementioned example, because attempting to compel the electronic device user to enter an alphanumeric password for accessing the electronic device 100 may, in some countries or scenarios, not be legally permissible, forcing the electronic device 100 into a "duress" mode may ameliorate the disadvantages described above relating to third parties attempting to compel the electronic device user to access the electronic device 100 using the biometric input of the user.

As the first authentication data 122a may include data relating to fingerprint images of known electronic device users, and as the second authentication data 122b may include data relating to alphanumeric characters of one or more passphrase(s) meant to be received at the electronic device 100 via the second input interface 128b, the first authentication data 122a may be different than the second authentication data 122b and may be used by the processor 112 for different verifying or determining operations.

Figure 3:
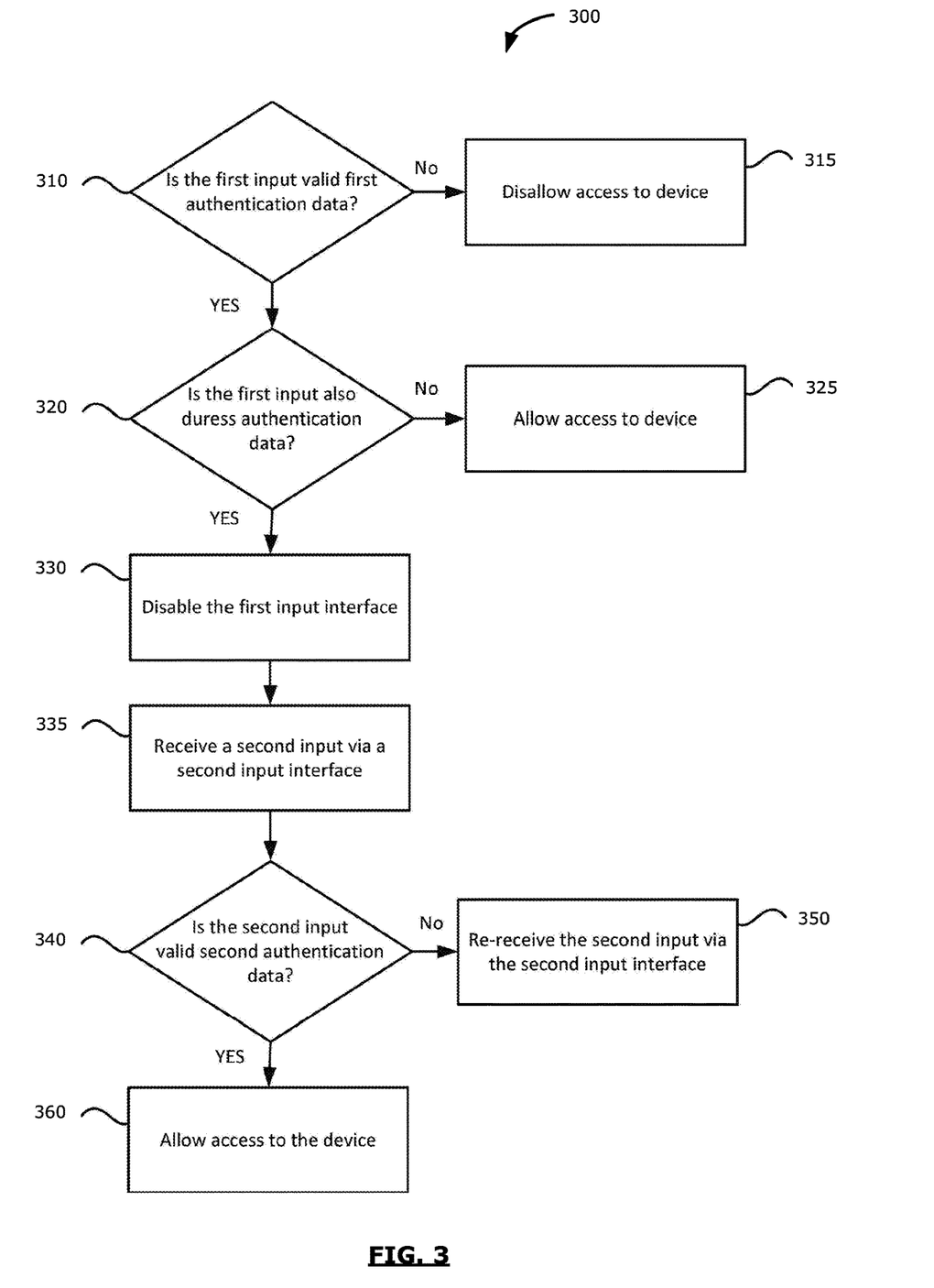
FIG. 3 illustrates, in flowchart form, a method of determining whether the first input is valid first authentication data, invalid authentication data, or duress authentication data, in accordance with an embodiment of the present application.

Reference is now made to FIG. 3, which illustrates, in flowchart form, a method 300 of determining whether the first input is valid first authentication data, invalid authentication data, or duress authentication data, in accordance with an embodiment of the present application. The method 300 may include operations that may be carried out by the electronic device 100 (FIG. 1). The method 300 may be implemented, at least in part, through processor-executable instructions stored for example at the access determination module 120 (FIG. 1). In some examples, one or more of the operations may be implemented via processor-executable instructions in other applications 118 or in the operating system 116.

In particular, the method 300 may be an example of operation 220 (FIG. 2) of determining whether the first input is valid first authentication data, invalid authentication data, or duress authentication data, in accordance with an embodiment of the present application.

After receiving the first input via the first input interface 128a, at operation 310, the processor 112 may determine whether the first input is valid first authentication data 122a (FIG. 1).

Continuing with the aforementioned example where the first input interface 128a may include a fingerprint scan input device and the second input interface 128b may include a virtual or physical keyboard for receiving an alphanumeric passcode, at operation 310, the processor 112 may verify a first fingerprint received via the first input interface 128a against the first authentication data 122a stored in the memory 114 (FIG. 1).

If the first fingerprint is not verified against one or more sets of first authentication data 122a, at operation 310, the processor 112 may determine that the first fingerprint may not be valid first authentication data.

At operation 315, the processor 112 may disallow access to the electronic device 100. For example, if access to the electronic device 100 is protected by an authentication wall or lock screen, at operation 315, the processor 112 may continue to display the authentication wall or lock screen on the output interface 126 (FIG. 1) and prevent the user from accessing the electronic device 100. In some examples, at operation 315, the processor 112 may continue to display the authentication wall or lock screen and may continue to prompt the user to enter a first input via the first input interface 128a (e.g., prompt the user to provide a fingerprint sample to the fingerprint scan input device).

If the first fingerprint is verified against one or more sets of first authentication data 122a, at operation 310, the processor 112 may determine that the first input is valid first authentication data 122a, and at operation 320 may determine whether the first input is also duress authentication data 122c (FIG. 1).

Duress authentication data 122c may include data relating to fingerprint images that may also be first authentication data 122a. That is, in some examples, duress authentication data 122c may correspond to a subset of the first authentication data 122a. As an illustrating example, first authentication data 122a may include data relating to fingerprint images of index and thumb fingers of both hands (e.g., both the left and right hand) of the known user of the electronic device 100. Duress authentication data 122c may include data relating to fingerprint images of the index and thumb fingers of the known user's left hand.

If the known user presents the index finger or thumb of the known user's right hand to the first input interface 128a, the processor 112 may determine that: (a) the first input is valid first authentication data (at operation 310); and (b) the first input is not duress authentication data (at operation 320). Accordingly, at operation 325, the processor 112 may allow access to the electronic device 100.

If the known user presents the index finger or thumb of the known user's left hand to the first input interface 128a, the processor 112 may determine that: (a) the first input is valid first authentication data 122a (at operation 310); and (b) the first input is also duress authentication data 122c (at operation 320).

When the user presents a fingerprint from the user's left index finger or left thumb, the user indicates to the electronic device 100 that the user would like to force a "duress mode", and require that a second valid authentication or input be accepted before providing access to the electronic device 100.

Thus, the known user of the electronic device 100 may elect to (a) access the electronic device 100 without "duress mode" by presenting a fingerprint from the user's right hand (e.g., when the user is not compelled by any third party to access the electronic device using a biometric input); or to (b) access the electronic device 100 with "duress mode" by presenting a fingerprint from the user's left hand (e.g., when the user may be compelled by a third party to access the electronic device using the biometric input). In some scenarios, when the user may be compelled to access the electronic device 100 using the biometric input, the user may act as if the user is appearing to comply with the third party's request; but unbeknownst to the third party, the user may be consciously signaling to the electronic device 100 that a second input should be requested before the processor 112 allows access to the electronic device 100.

In the aforementioned example, "duress mode" may be enabled by a known user to the electronic device 100. That is, because duress authentication data 122c may be considered after first authentication data 122a is considered, the electronic device 100 may trigger "duress mode" when the first input (e.g., fingerprint scan input) is valid first authentication data 122a. As described herein, operations relating to "duress mode" may require that the second input received via the second input interface 128b be valid second authentication data 122b.

The aforementioned configuration may be advantageous in preventing a third party who may have knowledge of an alphanumeric passcode corresponding to valid second authentication data 122b from accessing a misplaced/lost electronic device 100, but who may not be the known user of the electronic device 100 (e.g., this third party may have gained knowledge of the alphanumeric passcode by seeing the known user enter the alphanumeric passcode via the second input interface 128b at an earlier time). In the example method 300 of FIG. 3, this seemingly unscrupulous third party may not be able to enable the "duress mode" such that the third party may use the alphanumeric passcode for accessing the electronic device 100.

Referring still to FIG. 3, if, at operation 320, the processor 112 determines that the first input is also duress authentication data 122c, at operation 330, the processor 112 may disable the first input interface 128a. As the processor 112 may disable the first input interface 128a upon determining that the first input is also duress authentication data 122c, the electronic device 100 may require that input via the second input interface 128b be valid authentication data 122b before access to the electronic device may be granted.

Continuing with the example described above, if the processor 112 determines that the first fingerprint scan input is (a) valid first authentication data 122a; and (b) duress authentication data 122c, at operation 335, the processor 112 may receive a second input via the second input interface 128b. For example, the processor 112 may receive an alphanumeric passcode via a virtual keyboard (e.g., example second input interface 128b).

In some examples, the processor 112 may disable the first input interface 128a (e.g., operation 330) and receive the second input via the second input interface 128b (e.g., operation 335) in the order illustrated in FIG. 3. In other examples, the processor 112 may receive the second input via the second input interface 128b (e.g., operation 335) prior to the processor disabling the first input interface (e.g., operation 330). In yet other examples, the processor 112 may disable the first input interface 128a (e.g., operation 330) and receive the second input via the second input interface 128b (e.g., operation 335) at substantially similar times. In the above described examples, disabling the first input interface 128a may be useful when the known user knowingly triggers a "duress mode", such that a third party attempting to compel the user to access the electronic device 100 using that known user's biometric input may be thwarted. That is, once the first input received via the first input interface 128a is determined to be (a) valid first authentication data 122a; and (b) duress authentication data 122c, a "duress mode" may be triggered, and compelled access to the electronic device 100 using biometric input against the wishes of the known electronic device user may be thwarted.

At operation 340, the processor 112 may determine whether the second input is valid second authentication data 122b. For example, the processor 112 may determine whether a hash of the received alphanumeric passcode is verified against one or more sets of second authentication data 122b, where the second authentication data 122b may include hashes of one or more alphanumeric passcodes.

If the processor 112 determines that the received alphanumeric passcode (e.g., second input received via the second input interface 128b) is valid second authentication data 122b, at operation 360, the processor 112 may allow access to the electronic device 100.

If the processor 112 determines that the received alphanumeric passcode (e.g., second input received via the second input interface 128b) is not valid second authentication data 122b, at operation 350, the processor 112 may re-receive the second input via the second input interface 128b. That is, if a previously entered second input is inadvertently entered incorrectly and/or is not valid second authentication data 122b (e.g., determination at operation 340), the processor 112 may re-receive the second input and determine, at operation 340 again (not explicitly illustrated in FIG. 3), whether the second input is valid second authentication data 122b. Because in some examples the first input interface 128a may have been disabled (e.g., operation 330), the processor 112 may allow access to the electronic device 100 when the received (or re-received) second input is valid second authentication data 122b. Thus, in some examples, once a "duress mode" is triggered, the electronic device 100 may not be accessed via input from first input interface 128a.

Although the foregoing examples describe the electronic device 100 being configured with (a) a fingerprint scan input device as the first input interface 128a for receiving a first input; and (b) a keyboard device as the second input interface 128b for receiving a second input, in some other embodiments, the first input interface 128a and the second input interface 128b may be any other combination of input interfaces.

In some embodiments, the first input interface 128a may include an iris scan input device and the first input may include an iris scan input. Referring to FIG. 3, at operation 320, when the processor 112 determines if the first input is also duress authentication data, the processor 112 may determine whether the iris scan input is verified against a sequence of eye movements included in or stored as the duress authentication data. In this example, a known user of the electronic device 100 may utilize a sequence of eye movements for enabling a "duress mode", such that the sequence of eye movements for enabling the "duress mode" may be stored as the duress authentication data 122c. With the present example, the processor 112 may enable the "duress mode" when the iris scan input may be determined to be valid first authentication data (e.g., at operation 310). That is, determining whether eye movements are verified against duress authentication data (e.g., at operation 320) may occur after the processor 112 determines that the iris scan input is valid first authentication data (e.g., at operation 310) of the known user.

In some examples, pupils of a user may dilate when the user may be under stress, and the pupils of the user may constrict when the user may be relaxed. Accordingly, in some embodiments, detection of pupil size based on an iris scan input may be used for triggering a "duress mode". In other examples, pupils of a user may dilate when under the influence of alcohol or constrict when under the influence of other types of controlled substances. Accordingly, pupil size of the user may be a non-voluntary proxy for triggering a "duress mode".

For example, the first input interface 128a may be the iris scan input device and the first input may be an iris scan input. Referring again to FIG. 3, at operation 310, the processor 112 may determine whether the iris scan input is valid first authentication data 122a. At operation 320, the processor 112 may determine a pupil size from the iris scan input received at the first input interface 128a and, subsequently, the processor 112 may determine whether the pupil size exceeds a pupil size threshold. That is, the pupil size threshold based on prior obtained empirical data may be included with duress authentication data 122c, and the duress authentication data 122c may be used for determining whether the first input (e.g., iris scan input) is valid duress authentication data (operation 320, FIG. 3).

When determining whether the pupil size exceeds a stored pupil size threshold, in some embodiments, the second input may be configured to be a subsequent checkpoint for determining whether access may be granted to the electronic device 100. The second input may not necessarily be an authentication step, but rather a subsequent checkpoint for non-voluntary user features. For example, when the user may be under the influence of alcohol (or other controlled substance—such as marijuana), the user's pupils may be dilated (or constricted) as compared to a normal pupil state. Accordingly, if the electronic device 100 may be configured with the iris scan input device as the first input interface 128a, in some embodiments, the electronic device 100 may be configured with a breathalyzer sample input device as the second input device.

As dilated pupil size may indicate that the user is under the influence of alcohol, the second input may be useful as an additional check to determine whether the user has a blood-alcohol level that exceeds a legal level. When determining whether the second input is valid second authentication data (e.g., operation 340 of FIG. 3), the processor 112 may: (a) determine a blood-alcohol value from a second input from the breathalyzer sample input; and (b) determine whether the blood-alcohol value is below a blood-alcohol threshold. That is, the blood-alcohol threshold may be included with duress authentication data 122c in the memory 114 (FIG. 1).

Accordingly, allowing access to the electronic device 100 when the second input is valid second authentication data 122b may include allowing access to the device when the blood-alcohol value is below the blood-alcohol threshold. The aforementioned example including an iris scan input device as the first input interface 128a and a breathalyzer sample input device as the second input interface 128b may be configured in an electronic device 100 that may be installed in a vehicle. Allowing access to the electronic device 100 may be associated with allowing the user to start and operate an automobile or other vehicle, while disallowing access to the electronic device 100 may be associated with disallowing the user to start the automobile or other vehicle.

Because pupil size may vary depending on a variety of physiological factors, being under the influence of alcohol may be one of other possible causes of dilated pupils. Accordingly, in the "blood-alcohol" example above, the first input may be a coarse-grained determination of whether the user of the electronic device 100 may be under the influence of alcohol (or other controlled substance) and the second input may be a fine-grained determination of whether the user of the electronic device 100 may be under the influence of alcohol. If the user's pupils may be dilated for other reasons other than alcohol consumption (e.g., medical condition, stress, etc.), the user may nonetheless be allowed access to the electronic device 100 after providing the second input and when the second input is verified against valid second authentication data.

In some embodiments, some aspects of the present application may be configured to trigger some operation or to trigger a "duress mode" corresponding to a rate of change of pupil size. For example, when the user may have consumed alcohol or other controlled substance, a rate of change in pupil size in response to light may be lower than when the user may not have consumed alcohol or other controlled substance.

For example, the electronic device 100 may be configured with an iris scan input device as the first input interface 128a, and the first input may be an iris scan input. When the processor 112 determines whether the first input is also the duress authentication data (e.g., operation 320 of FIG. 3), the processor 112 may: (a) display a test image (on the output interface 126 of FIG. 1) having a screen brightness greater than a prior display image; (b) determine a rate of change of a pupil size from the iris scan input after displaying the test image; and (c) determine whether the rate of change in the pupil size is greater than a pupil size rate of change threshold. For example, the pupil size rate of change threshold may be stored in duress authentication data 122c.

Accordingly, in the aforementioned example relating to pupil size rate of change, the measured pupil size rate of change based on the iris scan input (e.g., first input) may be a non-voluntary proxy for triggering a "duress mode". That is, the electronic device 100 may be configured in a vehicle. When the first input indicating that the pupil size rate of change is lower than a threshold, the user may be under the influence of alcohol and the first input may cause or trigger a "duress mode". When the "duress mode" is triggered, valid second authentication data 122b is required before allowing access to the electronic device 100 that may be configured within the vehicle.

In some embodiments, aspects of the present application may be configured to trigger some operation or to trigger a "duress mode" corresponding to a "duress fingerprint" known to the user and where the "duress fingerprint" is stored duress authentication data 122c. For example, the first input interface 128a may be a fingerprint scan input device for receiving a fingerprint scan input. When the processor 112 determines whether the fingerprint scan input is also duress authentication data 122c (e.g., operation 320 at FIG. 3), the processor 112 may determine whether the fingerprint scan is verified against duress fingerprint data included in the duress authentication data 122c. For example, the received fingerprint scan input may be processed (e.g., transformed or hashed) and be compared with duress fingerprint data included in the duress authentication data 122c for determining whether the first input corresponds to the stored duress authentication data 122c.

For example, hashed or encrypted fingerprint data from the known user's index and thumb fingers of the left hand may be stored as duress authentication data 122c, and when the processor 112 determines that the fingerprint scan input (e.g., first input) verified against duress fingerprint data included with the duress authentication data 122c, the processor 112 may trigger the "duress mode".

In some embodiments, aspects of the present application may be configured to trigger some operation or trigger a "duress mode" corresponding to a "duress eye" of the user and where the "duress eye" is stored duress authentication data 122c. For example, the first input interface 128a may be a retinal scan input device for receiving a retinal scan input. As retinal scanning identification systems identify users based on unique patterns inherent in the user's retinal blood vessels, when the processor determines whether the first input is verified against the duress authentication data 122c (e.g., operation 320 at FIG. 3), the processor 112 may determine whether the retinal scan input is verified against retinal scan data of a duress eye of the user included in or stored as the duress authentication data 122c. For example, the user may know that data related to the user's left eye (or retinal blood vessels) may be stored as duress authentication data 122c, while data related to the user's right eye (or retinal blood vessels) may not be stored as duress authentication data 122c. That is, the data related to the user's right eye (or retinal blood vessels) may be stored as valid first authentication data, but may not be stored as duress authentication data 122c.

In some embodiments, aspects of the present application may be configured to trigger some operation or trigger a "duress mode" corresponding to facial movements of the user of the electronic device 100. For example, the first input interface 128a may be a facial recognition input device for detecting facial movements and features of the user. Referring again to FIG. 3, at operation 310, the processor 112 may determine whether a facial scan input is valid first authentication data 122a. The facial scan input may include details relating to a known user's unique facial features, and valid first authentication data 122a may include data relating to the known user's unique facial features. At operation 320, the processor 112 may determine whether facial movements (e.g., eye movements, lip movements, cheekbone movements, eyebrow movements, etc.) received via the first input interface 128a is verified against a sequence of facial movements stored as duress authentication data 122c. In this example, a known user of the electronic device 100 may utilize a known sequence of facial movements for enabling a "duress mode". Accordingly, "duress mode" may be enabled when (a) the facial scan input is valid first authentication data 122a (e.g., verifying data of known user's unique facial features); and (b) facial scan input includes facial movements stored as duress authentication data 122c.

In some embodiments, when the "duress mode" is triggered, the electronic device 100 may be configured to allow access to the electronic device 100 with reduced functionality. For example, when the "duress mode" is triggered, the electronic device 100 may be configured to provide "fake data" or a decoy user interface.

In some embodiments, when the "duress mode" is triggered, the electronic device 100 may be configured to transmit a notification to a third party indicating that a "duress mode" may be triggered. For example, the processor 112 may be configured to transmit, via the communication system 124, to a third party electronic device indicating that the "duress mode" may have been triggered on the electronic device 100.

In some embodiments, when the "duress mode" is triggered, the electronic device 100 may be configured to delete the contents of the memory 114 on the electronic device 100.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. An access control method comprising:
receiving a first input via a first input interface to determine whether the first input includes valid first authentication data, invalid authentication data, or duress authentication data;
determining that the first input includes the valid first authentication data and, in response to that determination, determining whether the first input also includes the duress authentication data;
in response to determining that the first input includes the valid first authentication data and the duress authentication data, disabling the first input interface and receiving a second input via a second input interface;
determining that the second input includes valid second authentication data; and
in response to determining that the second input includes valid second authentication data, allowing access.

2. The method of claim 1,
wherein when the second input does not include valid second authentication data, re-receiving the second input via the second input interface.

3. The method of claim 1, wherein the first input includes an iris scan input, and wherein determining whether the first input also includes the duress authentication data includes:
determining whether the iris scan input is verified against a sequence of eye movements stored as the duress authentication data.

4. The method of claim 1, wherein the first input includes an iris scan input, and wherein determining whether the first input also includes the duress authentication data includes:
determining a pupil size from the iris scan input; and
determining whether the pupil size exceeds a pupil size threshold.

5. The method of claim 4, wherein the second input includes a breathalyzer sample input,
and wherein determining whether the second input includes valid second authentication data includes:
determining a blood-alcohol value from the breathalyzer sample input; and
determining whether the blood-alcohol value is below a blood-alcohol threshold;
and wherein allowing access when the second input includes valid second authentication data includes allowing access when the blood-alcohol value is below the blood-alcohol threshold.

6. The method of claim 1, wherein the first input includes an iris scan input, and wherein determining whether the first input also includes the duress authentication data includes:
displaying a test image having a brightness greater than a prior display image;
determining rate of change of a pupil size from the iris scan input after displaying the test image; and
determining whether the rate of change in the pupil size is greater than a pupil size rate of change threshold.

7. The method of claim 1, wherein the first input includes a fingerprint scan input, and wherein determining whether the first input also includes the duress authentication data includes:
   determining whether the fingerprint scan input is verified against duress fingerprint data included in the duress authentication data.

8. The method of claim 1, wherein the first input includes a retinal scan input, and wherein determining whether the first input also includes the duress authentication data includes:
   determining whether the retinal scan input is verified against retinal scan data of a duress eye of a user included in the duress authentication data.

9. The method of claim 1, wherein the first input includes a biometric input including at least one of an iris scan input, a retinal scan input, a fingerprint scan input, handprint input, palm print input, or facial recognition input.

10. The method of claim 1, wherein the second input includes a non-biometric input including at least one of an alphanumeric input, a touchscreen gesture input, a breathalyzer sample input, pointing device input, facial or hand gesture input, pen/stylus input, or voice input.

11. The method of claim 1, further comprising:
   receiving a third input via the first input interface to determine whether the third input includes valid third authentication data, invalid authentication data, or third duress authentication data;
   determining that the third input includes the valid third authentication data and, in response to that determination, determining whether the third input also includes the third duress authentication data; and
   in response to determining that the third input does not include the third duress authentication data, allowing access.

12. An electronic device comprising:
   a processor;
   an input interface including a first input interface and a second input interface coupled to the processor to receive input; and
   a memory coupled to the processor and storing processor-readable instructions that, when executed, cause the processor to:
   receive a first input via the first input interface to determine whether the first input includes valid first authentication data, invalid authentication data, or duress authentication data;
   determine that the first input includes the valid first authentication data and, in response to that determination, determine whether the first input also includes the duress authentication data;
   in response to determining that the first input includes the valid first authentication data and the duress authentication data, disable the first input interface and receive a second input via the second input interface;
   determine that the second input includes valid second authentication data; and
   in response to determining that the second input includes valid second authentication data, allow access.

13. The electronic device of claim 12,
   wherein when the second input does not include valid second authentication data, the processor-readable instructions, when executed, cause the processor to re-receive the second input via the second input interface.

14. The electronic device of claim 12, wherein the first input includes an iris scan input, and wherein processor-readable instructions that, when executed, cause the processor to determine whether the first input also includes the duress authentication data includes:
   determining whether the iris scan input is verified against a sequence of eye movements included in the duress authentication data.

15. The electronic device of claim 12, wherein the first input includes an iris scan input, and wherein processor-readable instructions that, when executed, cause the processor to determine whether the first input also includes the duress authentication data includes:
   determining a pupil size from the iris scan input; and
   determining whether the pupil size exceeds a pupil size threshold.

16. The electronic device of claim 15, wherein the second input includes a breathalyzer sample input, and wherein processor-readable instructions that, when executed, cause the processor to determine whether the second input includes valid second authentication data includes:
   determining a blood-alcohol value from the breathalyzer sample input; and
   determining whether the blood-alcohol value is below a blood-alcohol threshold;
   and wherein processor-readable instructions that, when executed, cause the processor to allow access to the electronic device when the second input includes valid second authentication data includes:
   allowing access to the electronic device when the blood-alcohol value is below the blood-alcohol threshold.

17. The electronic device of claim 12, wherein the first input includes a biometric input including at least one of an iris scan input, a retinal scan input, a fingerprint scan input, handprint input, palm print input, or facial recognition input.

18. The electronic device of claim 12, wherein the second input includes a non-biometric input including at least one of an alphanumeric input, a touchscreen gesture input, a breathalyzer sample input, pointing device input, facial or hand gesture input, pen/stylus input, or voice input.

19. The electronic device of claim 12, wherein the processor-readable instructions, when executed, further cause the processor to:
   receive a third input via the first input interface to determine whether the third input includes valid third authentication data, invalid authentication data, or third duress authentication data;
   determine that the third input includes the valid third authentication data and, in response to that determination, determine whether the third input also includes the third duress authentication data; and
   in response to determining that the third input does not include the third duress authentication data, allow access.

20. A non-transitory computer-readable storage medium comprising processor-executable instructions which, when executed, configure a processor to:
   receive a first input via a first input interface to determine whether the first input includes valid first authentication data, invalid authentication data, or duress authentication data;
   determine that the first input includes the valid first authentication data and, in response to that determination, determine whether the first input also includes the duress authentication data;
   in response to determining that the first input includes the valid first authentication data and the duress authentication data, disable the first input interface and receive a second input via a second input interface;

determine that the second input includes valid second authentication data; and in response to determining that the second input includes valid second authentication data, allow access.

* * * * *